(12) United States Patent
Alam (10) Patent No.: US 8,012,350 B1
(45) Date of Patent: Sep. 6, 2011

(54) DIALYSIS DEVICE

(76) Inventor: Aftab Alam, Chesterfield, MO (US)

( * ) Notice: Subject to any disclaimer, the term of this patent is extended or adjusted under 35 U.S.C. 154(b) by 0 days.

(21) Appl. No.: 12/590,667

(22) Filed: Nov. 12, 2009

Related U.S. Application Data

(60) Provisional application No. 61/199,072, filed on Nov. 14, 2008.

(51) Int. Cl.
*B01D 61/24* (2006.01)
*B01D 61/28* (2006.01)

(52) U.S. Cl. .......... 210/321.71; 210/232; 210/257.2; 210/321.6; 210/644; 210/645; 436/177; 436/178

(58) Field of Classification Search .............. 210/321.6, 210/321.71
See application file for complete search history.

(56) References Cited

U.S. PATENT DOCUMENTS

| | | | | |
|---|---|---|---|---|
| 5,733,449 | A * | 3/1998 | Bowers et al. | 210/321.6 |
| 6,039,871 | A * | 3/2000 | Sykaluk | 210/321.71 |
| 6,217,772 | B1 * | 4/2001 | Alam | 210/644 |
| 2003/0006610 | A1 * | 1/2003 | Werth | 285/243 |
| 2003/0133846 | A1 * | 7/2003 | Ben-Asouli et al. | 422/102 |
| 2004/0030294 | A1 * | 2/2004 | Mahurkar | 604/192 |
| 2005/0090783 | A1 * | 4/2005 | Sibbitt, Jr. | 604/263 |

* cited by examiner

*Primary Examiner* — Tony G Soohoo
*Assistant Examiner* — Peter Keyworth (57) ABSTRACT

A dialysis device having a dialysis tube with a closed end and an open end, the open end is provided with a dialysis reservoir having a dialysis membrane.

20 Claims, 7 Drawing Sheets

DIALYSIS DEVICE

CROSS REFERENCE TO RELATED APPLICATIONS

This application claims priority from the provisional patent application No. 61/199,072, filing date Nov. 14, 2008.

HISTORY OF THE INVENTION

Dialysis of samples for exchange of buffers & equilibration is widely used in chemical and biochemical processes.

The U.S. Pat. No. 6,217,772 describes a dialysis device in centrifuge tube configuration wherein the cap of the tube, described in the invention as dialysis reservoir is provided with a dialysis membrane for exchange of buffer across the dialysis membrane. The cap on the dialysis tube is screw thread mounted on the dialysis tube and the whole assembly can be inverted in to a dialysis tank for dialysis. One of the embodiments of the invention describes the cap or the dialysis reservoir made of an outer element and an inner element. The outer and inner elements are designed to sleeve over or telescopically receive the inner element and the two pieces fit tightly or snugly together. The outer and the inner elements are provided with a self-locking structure to lock them relative to one another such as a bayonet mount. The outer and the inner elements are provided with a geometric structure to prevent the rotation of the outer element relative to the inner element or vice-versa. The inner element is provided with threads for screw mounting on the dialysis tube.

For assembly of the outer and the inner elements to form a dialysis reservoir, a dialysis membrane and a gasket are placed between the two elements and the inner element is pushed into the outer element which sandwiches the dialysis membrane and the gasket between the two elements.

The specification of this embodiment of the invention lacks many details and for those skilled in the art cannot construct this dialysis device without facing numerous engineering challenges. For example the U.S. Pat. No. 6,217,772 fails to describe the geometric shape of the membrane and how it will be placed in the dialysis reservoir whether the membrane is a circular cut disk to fit the size of the trough bore or a large size disk to wrap around inner element. This specification also does not specify how the gasket will be positioned on the membrane and sandwich between the inner and outer elements. The difficulty can be appreciated once one understands the properties of dialysis membranes and engineering and handling challenges of such assembly.

The dialysis membranes are made of inter-woven cellulose matrix to create defined porosity for dialysis. Dialysis membranes are fragile and cannot withstand mechanical stress without damage or altering of the porosity of the dialysis membrane. The cellulose matrix of dialysis membrane is not amenable to gluing to plastic, wood, or metallic surfaces. Any glue applied on the membrane will also undermine porosity of the membrane. Furthermore, wide verities of dialysis membrane are manufactures and provided for use and storage in aqueous medium making it even more difficult to glue on any surface.

Thickness and rigidity of dialysis membranes varies with the porosity and changes with handling procedures. Tolerance to mechanical handing and mechanical stress also varies from membrane to membrane; the shape, rigidity and size of dialysis membrane changes with fluid and humidity contents of the membrane.

The U.S. Pat. No. 6,217,772 fails to adequately describe the self-locking structure to lock the outer and inner elements relative to one another. The bayonet mount will not work against fragile dialysis membranes and the fact that the outer and inner elements are provided with multifaceted structure to eliminate rotation of the inner and outer elements relative to one another.

The U.S. Pat. No. 6,217,772 does not specify how tightly or snugly the outer and inner membranes should fit together. These two terms "tightly" and "snugly" are vague. The disclosure does not specify as to how the tight and snug fitting of the outer and inner members will impart on the assembly of the device with a fragile dialysis membrane and a gasket placed on the dialysis membrane.

The U.S. Pat. No. 6,217,772 does not specify the structure of the self locking mechanism and it's impart on the assembly process given the fact that the dialysis membrane will not stand mechanical force or stress applied to the dialysis membrane. If membrane wraps over the inner member the disclosure does not teach how to avoid the membrane interfering with the self locking mechanism.

The U.S. Pat. No. 6,217,772 further fails to specify the positioning of the self-locking structure on either outer or inner elements, or both relative to the position of the membrane and the gasket. This disclosure also does not explain how the structure and the design of the self locking structure will impact on the positioning of the gasket on the membrane and the process of assembly of the device which requires cooperation of the inner and outer elements, membrane and the gasket.

The above identified patent specification lacks of specificity makes it difficult for those skilled in the art to reproduce this embodiment of the invention without further innovation and engineering challenge. This particular embodiment of the U.S. patent has not been reduced to practice. The present invention overcomes the limitations of the U.S. Pat. No. 6,217,772. The present invention describes a new dialysis device.

SUMMARY OF THE INVENTION

This invention related to a dialysis device, a method of dialysis, and a method for making a dialysis device for dialysis of liquid samples.

According to the present invention the dialysis device is provided with a dialysis tube and a dialysis reservoir. The dialysis tube having a closed end and the end opposite the closed end is an open end. The open end of said dialysis tube is provided with mounting threads. The dialysis reservoir is mounted on the open end of the dialysis tube.

The dialysis reservoir has an open end and the end opposite the open end is provided with a dialysis membrane. The dialysis reservoir is made of an outer element and an inner element wherein the outer element receives the inner element, and a dialysis membrane is positioned between the two elements. The inner element of the dialysis reservoir sleeves into the outer element of the dialysis reservoir.

Both inner and the outer elements of the dialysis reservoir are provided with a means to prevent the rotation of the two elements relative to one another. Preferably the inner and the outer elements of the dialysis reservoir are provided with a means or a geometric structure to prevent the rotation of the outer element relative to the inner element. Preferably both inner and the outer elements have structures or are multifaceted having three or more faces. It is important to appreciate that in the outer element the rotation prevention means, structure, or multifaceted feature is provided on the inside surface where as in the inner element it is provided on the outside surface.

The inner element of the dialysis reservoir has a through bore. The outer surface of the inner element is provided with a leading end and the end opposite the leading end is an open end. The leading end first enters the outer element through the open end of the outer element. The lengthwise area between the leading end and the end opposite the leading end (open end) is interlocking section. The interlocking section is preferably tapered and is provided with a self locking irreversible (none-returnable) interlocking mechanism. The tapering on the interlocking section preferably has 5-20 degree tapering angle. The irreversible interlocking mechanism in the inner element preferably has a male feature preferably having interlocking angle between 10-30 degrees. The lengthwise area of the leading end and the end opposite the leading end (open end) are preferably substantially in similar plane.

The inside face of the inner element is provided with mounting threads for securing on the open end of the dialysis tube.

The outer element has a through bore and an open end and the end opposite the open end is a resting-end (for the inner element) and is provided with a flange or a circumferential lip to prevent the inner element pass through the outer element. The flange or circumference lip extends beyond the circumference of the inner element and the circumference of the dialysis tube. The flange also serves as a support for the externally placed gasket in the dialysis reservoir.

The inside face of the outer elements has the following features, the lengthwise area between the open end and the end opposite the open end (resting-end) is interlocking section; the interlocking section is preferably tapered having 5-10 degree tapering angle and provided with an irreversible (none-returnable) interlocking mechanism. The irreversible interlocking mechanism preferably has a female feature preferably having interlocking angle between 10-30 degrees. The lengthwise area and the inside diameter of the open end and the end opposite the open end (resting-end) are preferably substantially in similar plane.

The outer diameter of the leading-end of the inner element and the inside diameter of the open end of the outer element has clearance substantially identical or an order of magnitude greater than the thickness of the dialysis membrane in order to ensure little or no frictional stress on the dialysis membrane at the time of assembly. Preferably, both inner and outer elements fit together loosely without exerting pressure on the dialysis membrane, i.e., the assembly is not seal tight or leak proof.

The length of the leading-end on the inner element and the length of the open end on the outer element is preferably substantially identical or longer than the length of the dialysis membrane wrapping (folding) over the inner element at the moment of assembly of the two elements.

Preferably, the irreversible interlocking mechanisms on the inner and outer elements lock at a position a distance away from the wrapped (folded) dialysis membrane in a fully assembled position.

Preferably, the outer and the inner elements of the dialysis reservoir are made of materials of dissimilar flexibility, wherein in the outer element is more flexible than the inner element. Preferably, the outer and the inner elements of the dialysis reservoir are made with structural features and/or dimensional thickness that affords the two elements dissimilar flexibility, wherein in the outer element is more flexible than the inner element.

Preferably, the inner and outer elements are made of differentially flexible materials, wherein the inner element is more rigid than the outer element. Preferably, as an example the inner element is made of polypropylene, polycarbonate, nylon or similar rigid materials where as the outer element is made of polyethylene (high or low density) or ethylene. The greater flexibility of the outer elements allows flexing or expansion of the outer element at the time of assembly allowing interlocking of the two elements.

For assembly of the two elements into a dialysis reservoir, a dialysis membrane of a diameter larger than the diameter of the leading end of the inner element is placed between the outer and inner element and the inner element is pushed into the outer element until the two elements irreversibly interlock. After assembly of the two elements, a gasket is externally placed on the dialysis membrane through the open end of the inner element, the gasket is supported on the flange of the outer element. The diameter or circumference of the gasket is equal to or less than the inner diameter of the inner element. The dialysis reservoir is mounted on the open end of the dialysis tube. When the dialysis reservoir is fasten on the dialysis tube the open end of the dialysis tube press against the externally placed gasket support from the opposite side by the flange on the outer element thus creating tight seal between the dialysis reservoir, membrane, and the dialysis tube.

For dialysis of a liquid sample, sample is placed in the dialysis tube and the dialysis reservoir is mounted on the open end of the dialysis tube. When the dialysis reservoir is fastened (mounted) on the open end of the dialysis tube the open end of the dialysis tube compresses (press) against the externally placed gasket inside the dialysis reservoir thus creating a liquid tight seal for the sample inside the dialysis tube. The assembled dialysis device is secured on a floating device in inverted position allowing the sample in the dialysis tube to rest on the dialysis membrane in the dialysis reservoir. The assembly of dialysis device and the floating device is floated in a dialysis liquid buffer tank for dialysis and exchange of molecules across the dialysis membrane. After dialysis process is complete the liquid sample inside the tube is collected by removing the dialysis reservoir from the dialysis tube. The dialysis device may be briefly centrifuged (before undoing or removing the dialysis reservoir) allowing the sample to collect at the bottom of the dialysis tube improving recovery of the sample.

The float or the floatation device is a buoyant material provided with a means to secure the dialysis device, preferably dialysis tube. Foam or light plastic materials may be used as float for the dialysis device, preferably a foam disk or a light material disk with a slit or hole to secure the dialysis tube.

BRIEF DESCRIPTION OF THE DRAWINGS

The invention is explained with the help of following drawings.

PREFERRED EMBODIMENT OF THE INVENTION

Figure 1:
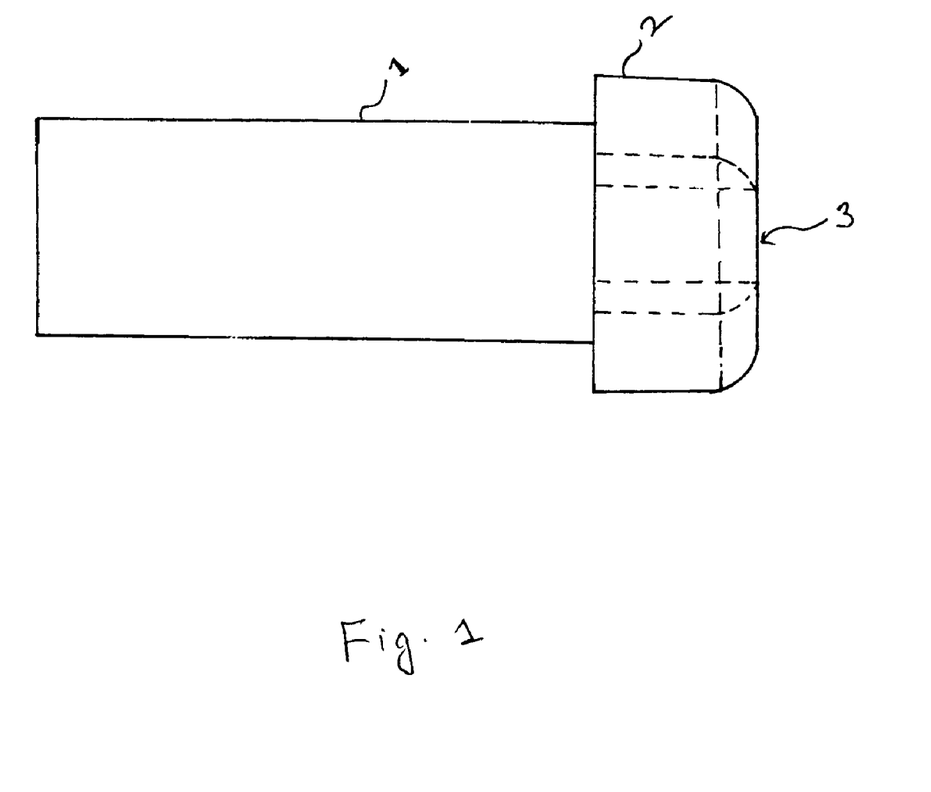
FIG. 1 shows side view of a dialysis device consisting of a dialysis tube and a cap that contains a dialysis membrane and acts as a dialysis reservoir.
Figure 2A:
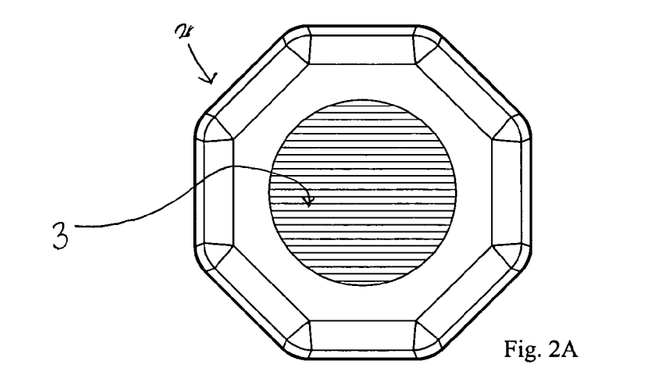
FIG. 2A shows frontal view of the cap dialysis reservoir containing dialysis membrane
Figure 8:
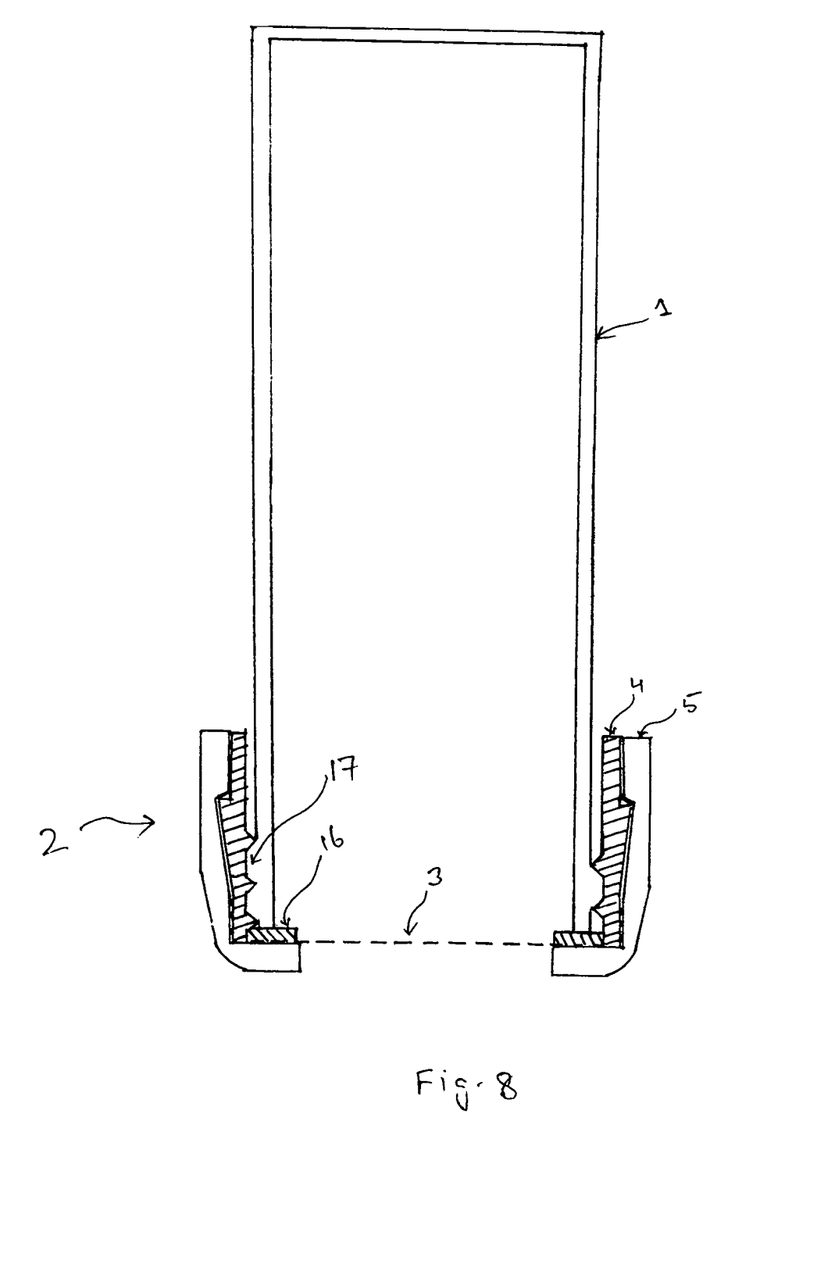
FIG. 8 shows cross sectional slice view of the dialysis device wherein a gasket is externally placed through the open end of the inner element and freely rests on the dialysis membrane and a dialysis tube is mounted in the dialysis reservoir.

The embodiment of the present invention shown in FIG. 1 contains a dialysis tube 1 and a cap 2, wherein the cap acts as a dialysis reservoir. The dialysis tube 1 has an open end and the end opposite the open end is closed. The outer surface of the open end of the dialysis tube is provided with mounting threads 17 (FIG. 8). The dialysis reservoir 2 is provided with multifaceted geometric structure, preferably containing eight faces; FIG. 2A shows front view of the dialysis reservoir with eight faces. The dialysis reservoir has an open end which is mounted on the open end of the dialysis tube 1 and the end opposite the open end is provided with a dialysis membrane 3, as shown in FIG. 2A.

Figure 2B:
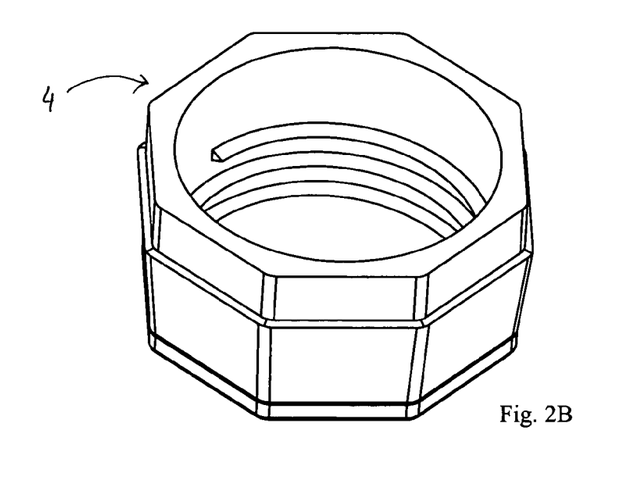
FIG. 2B shows top view of an inner element of the dialysis reservoir.
Figure 2C:
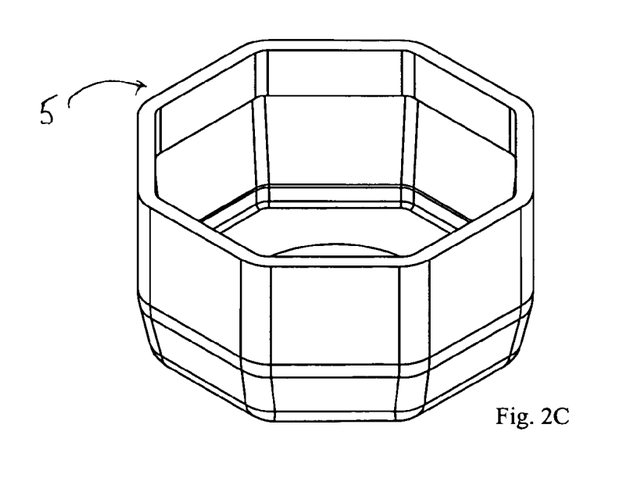
FIG. 2C shows top view of an outer element of the dialysis reservoir.
Figure 3A:
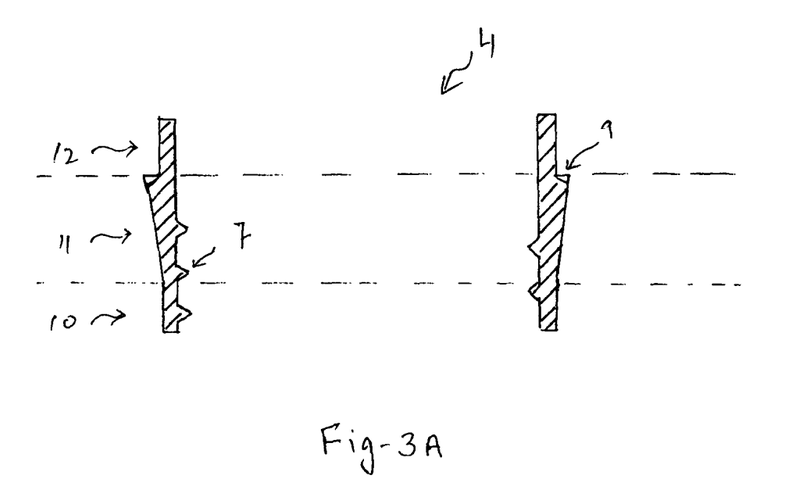
FIG. 3A shows a cross sectional slice view of the inner element of the dialysis reservoir.
Figure 4A:
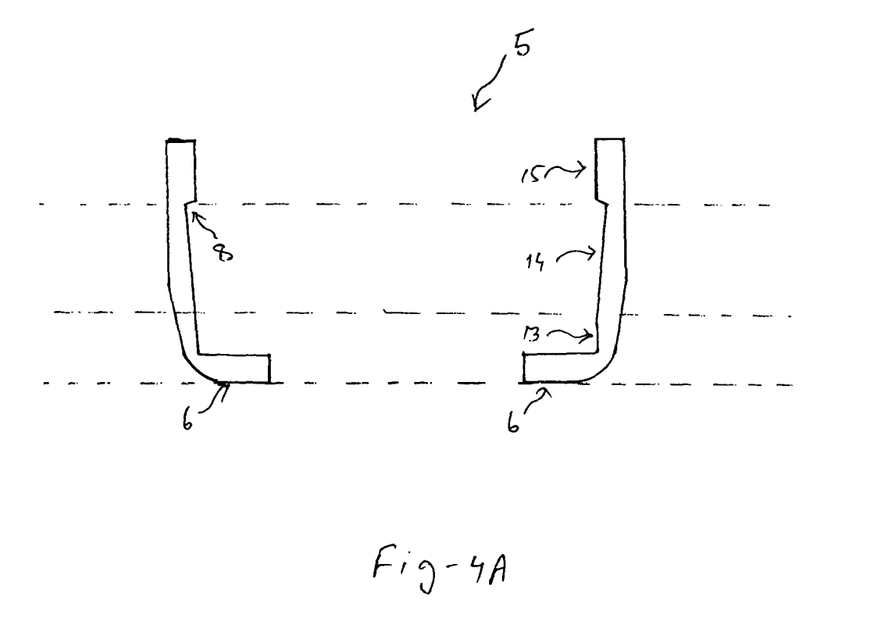
FIG. 4A shows cross sectional slice view of the outer element of the dialysis reservoir.
Figure 7:
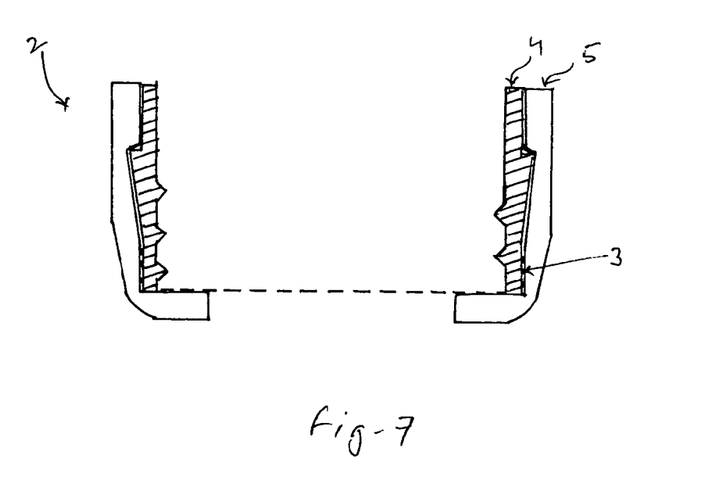
FIG. 7 shows cross sectional slice view of the fully assembled inner and outer elements of the dialysis reservoir, containing a dialysis membrane.

The dialysis reservoir 2 is made of an inner element 4 shown in FIG. 2B and FIG. 3A and an outer element 5 shown in FIG. 2C and FIG. 4A. The inner element is designed to sleeve into the outer element as shown in FIG. 7 in fully assembled position. Preferably, the outer element is made of polyethylene and whereas the inner element is made of polypropylene.

Figure 3B:
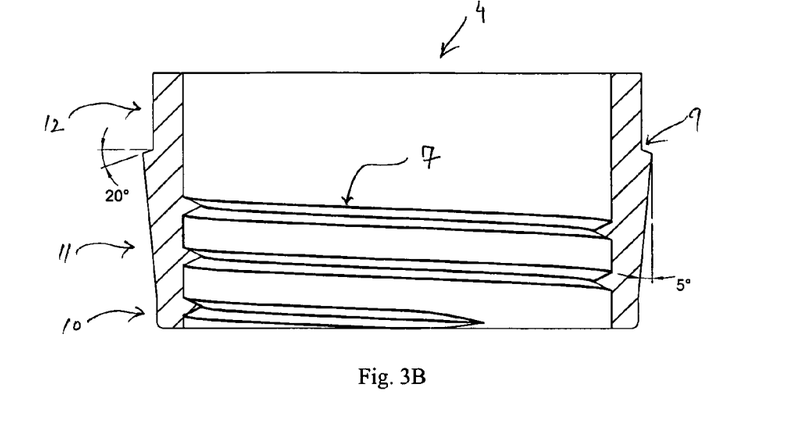
FIG. 3B shows a cut out sectional view of the inner element of the dialysis reservoir

The outer face of the inner element 4 has preferably three geometrically distinct areas as shown in FIG. 3A, the leading-end 10, and the end opposite the leading-end is marked as open end 12. The lengthwise area between the leading-end 10 and the open end 12 is an interlocking section 11. The interlocking section is tapered having 5-10 degree tapering angle (FIG. 3B shows 5 degree tapering angle) and contains an irreversible interlocking feature, which tapers out in a protruding male feature 9 preferably having an interlocking angle between 10-30 degrees (FIG. 3B shows 20 degree interlocking angle). The inner face of the inner element is provided with treads 7.

Figure 4B:
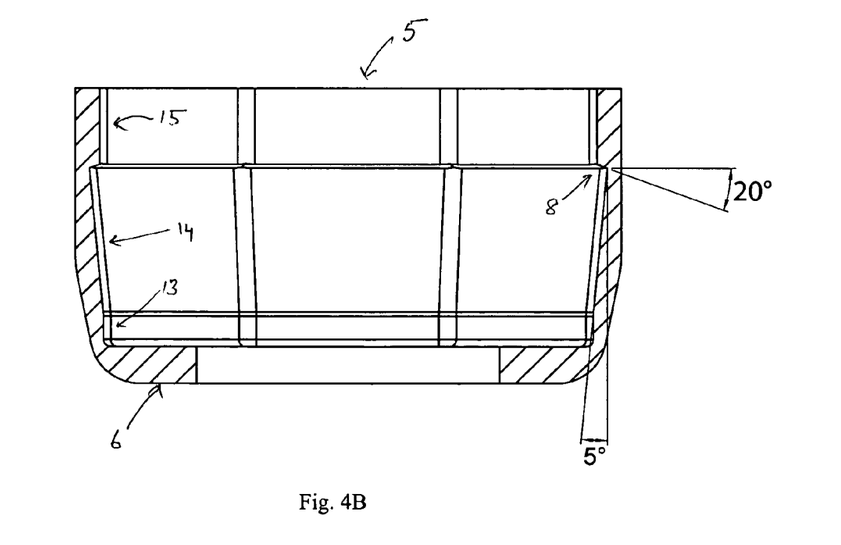
FIG. 4B shows a cut out sectional slice view of the outer element of the dialysis reservoir.

The outer element 5 has a through bore and the inner face has preferably three geometrically distinct areas, the open end 15 and the end opposite the open is marked as resting end 13. The resting end is provided with a flange or a circumferential lip 6 to prevent the inner element pass through the outer elements. The lengthwise area between the open end 15 and the resting end 13 has an interlocking section 14. The interlocking section is tapered having 5-10 degree tapering angle (FIG. 4B shows 5 degree tapering angle) and contains a tapered interlocking feature, which taper into a (depression) female feature 8 preferably having an interlocking angle between 10-30 degrees (FIG. 4B shows 20 degree interlocking angle).

Preferably, the length of the leading end 10 of the inner element and the length of the open end 15 of the outer element are substantially similar if not identical. Furthermore, the outer diameter of the of the leading end 10 and the inner diameter of the open end 15 is provides with just enough clearance to accommodate a dialysis membrane 3 (i.e., preferably similar or greater to the thickness of the membrane)—this clearance is such that when the two elements sleeves into each other there is little or no frictional force exerted on the dialysis membrane and the two elements loosely fits together.

Preferably, the length of the resting end 13 on the outer element is substantially similar if not identical to the length of the leading end 10. Furthermore, the outer diameter of the leading end 10 and the inner diameter of the resting end 13 is provides with just enough clearance to accommodate a wrapped dialysis membrane 3 without exerting significant amount of frictional stress on the dialysis membrane.

Figure 5:
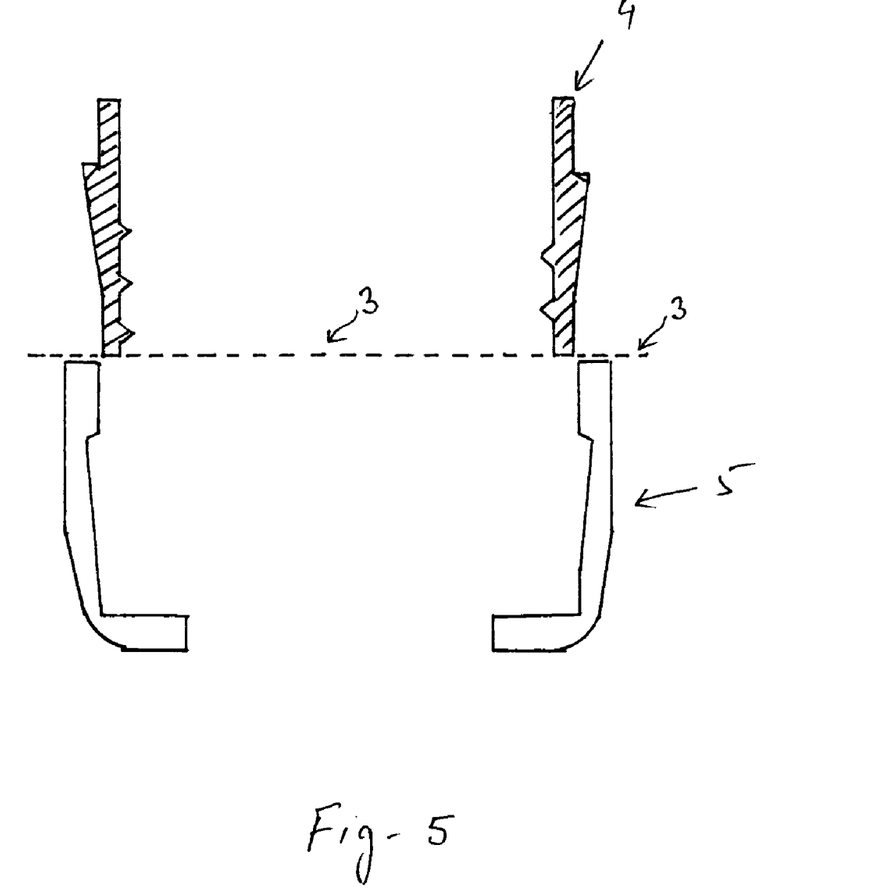
FIG. 5 shows cross sectional slice view of the outer and inner elements of the dialysis reservoir brought together in to assembly position, with a piece of dialysis membrane positioned between the two elements.
Figure 6:
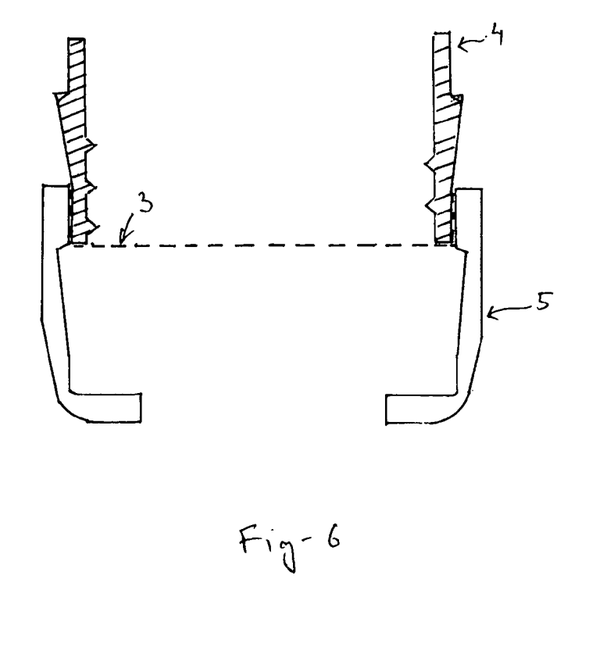
FIG. 6 shows cross sectional slice view of the assembly of the outer and inner elements as the leading end of the inner element sleeves into the open end of the outer element taking with it a piece of the dialysis membrane wrapped over the leading end of the inner elements.

FIG. 5 shows both inner and outer elements of the dialysis reservoir aligned for assembly, where the leading-end 10 of the inner element is facing the open end 15 of the outer elements. A piece of dialysis membrane 3 is positioned between the two elements. It is important to note that the size of the dialysis membrane (diameter) is such that when the two elements sleeve into each other the dialysis membrane wrap around the leading-end 10 of the inner elements (FIG. 6) and the wrapped part of the dialysis membrane preferably does not extend beyond the length of the leading end (FIG. 6) thus minimizing frictional stress on the dialysis membrane as the two elements traverse into each other, pass the irreversible interlocking mechanism 8 & 9, and before resting on the flange 6 as shown in FIG. 7. The size of the membrane is such that after wrapping over the inner element and in fully assembled position the membrane does not reach up to the interlocking mechanism, 8 & 9 i.e., the interlocking mechanism is a distance away from the wrapped dialysis membrane 3. Thus, dialysis membrane does not interfere with the interlocking mechanism.

After the assembly of the two elements with the dialysis membrane is sandwich between them as shown in FIG. 7, the dialysis reservoir 2 is ready for positioning on the open end of the dialysis tube 1. Before positioning the dialysis reservoir on the tube 1 a gasket 16 is externally placed in the dialysis reservoir on top of the dialysis membrane 3, and within the inner circumference of the inner element, as shown in FIG. 8. It is important to note that the diameter of the gasket is equal to or less than the inner circumference (diameter) of the inner element thus sits freely on the membrane.

For dialysis of a sample, the sample is place in the tube 1 and the dialysis reservoir 2 containing a gasket 16 is screw mounted on the open end of the tube 1. As the dialysis reservoir screw mounted on the dialysis tube the open end of the dialysis tube 1 press against the gasket 16 creating a tight and leak proof seal. The assembly of the dialysis tube 1 and the dialysis reservoir 2 is inverted and secured in a floating device and placed in a dialysis buffer tank for dialysis—the sample inside the dialysis tube positions on the dialysis membrane and the process of exchange of buffer components begin. After dialysis, the dialysis device may be briefly spun to collect the sample in the dialysis tube; dialysis reservoir is removed from the dialysis tube for sample collection.

What I claim my invention is:

1. A dialysis device for dialyzing liquid samples, comprising:
    a dialysis reservoir having an open end and the end opposite the open end is provided with a dialysis membrane, said dialysis reservoir having an outer element and an inner element wherein the outer element receives the inner element, wherein a dialysis membrane is wrapped around the inner element by folding over the leading-end of the inner element, wherein the inside face of the inner element is provided with mounting threads, wherein a gasket is externally placed on top of the membrane, wherein the diameter of the gasket is equal to or less than the inner diameter of the inner element such that the gasket sits freely on the membrane; and a dialysis tube, said dialysis tube having a closed end and the end opposite the closed end is open end wherein the open end is provided with mounting threads for mounting in the open end of the dialysis reservoir.

2. A dialysis device according to claim 1 wherein the outer element and the inner elements of the dialysis reservoir are provided with a means to prevent the rotation of the two elements relative to one another.

3. A dialysis device according to claim 2 wherein the outer element and the inner elements of the dialysis reservoir are provided with geometric structures to prevent the rotation of the two elements relative to one another.

4. A dialysis device according to claim 1 wherein the outer element and the inner elements of the dialysis reservoir are provided with an irreversible interlocking section.

5. A dialysis device according to claim 4 wherein the irreversible interlocking section is tapered wherein the tapering angle is between 5-10 degrees.

6. A dialysis device according to claim 4 wherein the irreversible interlocking section is provided with an irreversible interlocking mean.

7. A dialysis device according to claim 6 wherein the outer element of the dialysis reservoir is provided with female interlocking means, wherein the interlocking angle is between 10-30 degrees.

8. A dialysis device according to claim 1 wherein the end opposite the open end of the outer element is provided with a circumferential lip to prevent the inner element pass through the outer element and provide a resting support for the externally placed gasket.

9. A dialysis reservoir for mounting on the open end of a dialysis tube for dialysis of a sample comprising:
   an inner element;
   an outer element which receives the inner element, wherein the inner element is provided with threads for mounting on the open end of the dialysis tube;
   a dialysis membrane wrapped around the inner element by folding over the leading-end of the inner element; and
   a gasket externally placed on top of the dialysis membrane, wherein the diameter of the gasket is equal to or less than the inner diameter of the inner element such that the gasket sit freely on the membrane.

10. A dialysis reservoir according to claim 9 wherein the outer element and the inner elements are provided with means to prevent the rotation of the two elements relative to one another.

11. A dialysis reservoir according to claim 10 wherein the outer element and the inner elements are provided with geometric structures to prevent the rotation of the two elements relative to one another.

12. A dialysis reservoir according to claim 9 wherein the end opposite the open end of the outer element is provided with a circumferential lip to prevent the inner element pass through the outer element and support the externally placed gasket.

13. A dialysis reservoir according to claim 9 wherein the outer element and the inner elements of the dialysis reservoir are provided with an irreversible interlocking section.

14. A dialysis reservoir according to claim 13 wherein the irreversible interlocking section is tapered wherein the tapering angle is between 5-10 degrees.

15. A dialysis reservoir according to claim 13 wherein the irreversible interlocking section is provided with an irreversible interlocking mean.

16. A dialysis reservoir according to claim 15 wherein the outer elements of the dialysis reservoir is provided with a female interlocking means wherein the interlocking angle is between 10-30 degrees.

17. A method of dialyzing a liquid sample with a dialysis device, comprising:
   depositing a sample for dialysis in a dialysis tube, said dialysis tube having a closed end and the end opposite the closed end is open end wherein the open end is provided with mounting threads;
   mounting a dialysis reservoir on the open end of the dialysis tube, said dialysis reservoir having an outer element and an inner element wherein the outer element receives the inner element, wherein a dialysis membrane is wrapped around the inner element by folding over the leading-end of the inner element, wherein the inside face of the inner element is provided with mounting threads, wherein a gasket is externally placed on top of the membrane, wherein the diameter of the gasket is equal to or less than the inner diameter of the inner element such that the gasket sits freely on the membrane, wherein the outer element is further provided with a circumferential lip to prevent the inner element pass through the outer element and provide a resting support for the externally placed gasket;
   the dialysis device is inverted and secured on a floating device wherein the dialysis reservoir faces downward allowing the sample to rest on the dialysis membrane; and
   the dialysis device secured on the floating device is floated in a dialysis solution for exchange of molecules across the dialysis membrane.

18. A method of dialysis according to claim 17 wherein the inner and outer elements are provided with geometric structures to prevent the rotation relative to one another, wherein the inner and outer elements are further provided with irreversibly interlocking mechanism.

19. A method according to claim 18 wherein the irreversibly interlocking mechanism is a male and a female type having irreversible interlocking angle 10-30 degrees.

20. A method according to claim 17 wherein when the dialysis reservoir is mounted on the open end of the dialysis tube the open end press against the externally placed gasket on the dialysis membrane creating a liquid tight seal for dialysis of the sample.

* * * * *